Patented Sept. 30, 1952

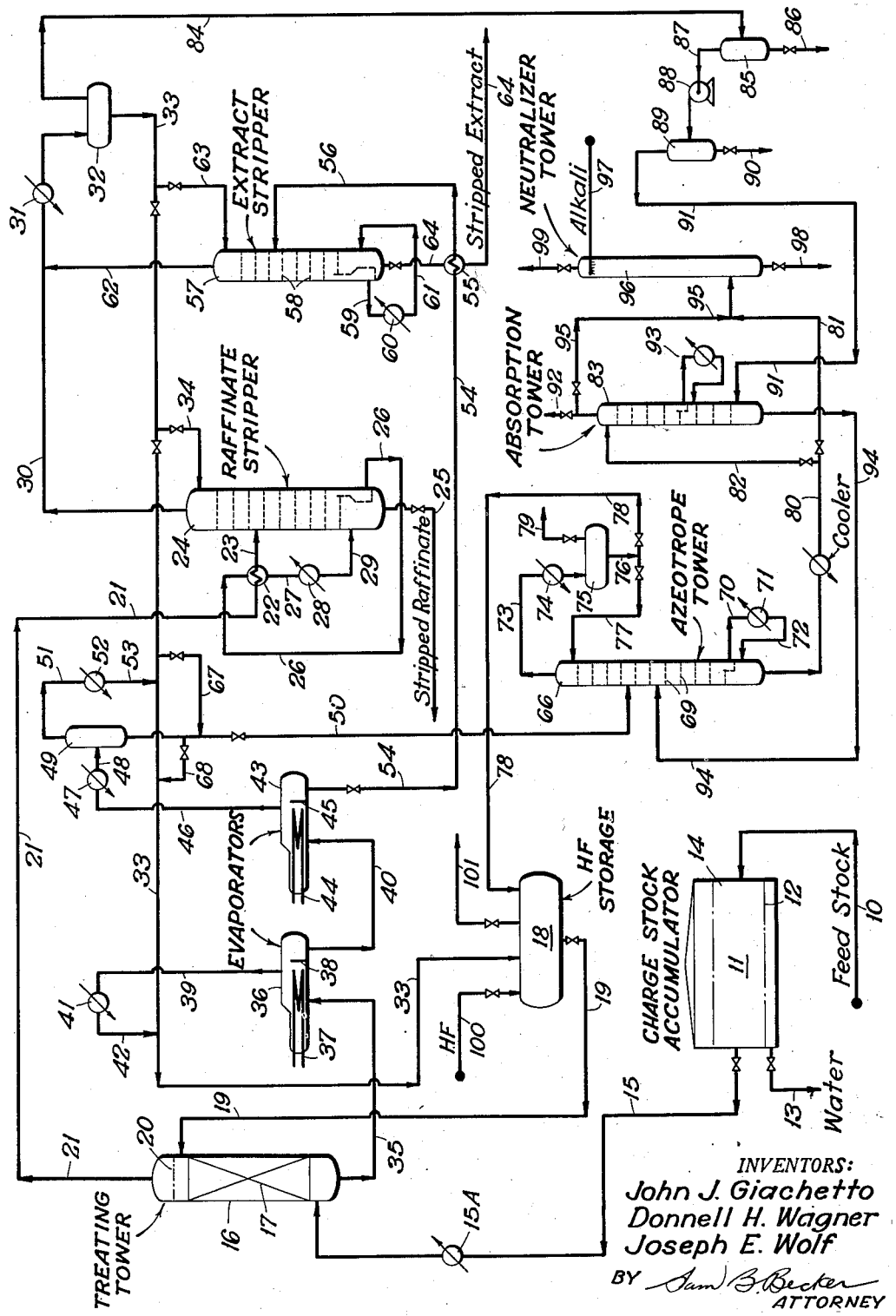

2,612,464

UNITED STATES PATENT OFFICE 2,612,464

PROCESS AND SYSTEM FOR TREATING HYDROCARBON OIL WITH LIQUID HYDROGEN FLUORIDE

John J. Giachetto, Calumet City, and Donnell H. Wagner, Chicago, Ill., and Joseph E. Wolf, Hammond, Ind., assignors to Standard Oil Company, Chicago, Ill., a corporation of Indiana Application December 22, 1949, Serial No. 134,518

9 Claims. (Cl. 196—13)

This invention relates to a process and apparatus for refining high boiling hydrocarbon oils with liquid hydrogen fluoride. More particularly, it relates to a process and apparatus for refining high boiling hydrocarbon oils containing sulfur compounds and dissolved water with liquid hydrogen fluoride to prepare distillate fuel oils and exceptionally suitable charging stocks for cracking in the presence of solid siliceous catalysts, particularly natural or synthetic silica-alumina or silica-magnesia catalysts, to produce high octane, low sulfur gasolines.

In the following description we shall, in considerable measure, employ the terminology of solvent extraction, i. e., we shall refer to the refined or treated oil as the raffinate and to the solution of water, HF-soluble hydrocarbons, $H_2S$ and other sulfur compounds in liquid hydrogen fluoride as the extract, hydrogen fluoride being designated as a solvent. This terminology is adopted for purposes of convenience and because it is to some extent descriptive of the process here under consideration. However, it will be understood that the refining of high boiling hydrocarbon oils which contain naturally occurring sulfur compounds, particularly thiophene and thiophane type sulfur compounds and water, as well as certain polycyclic aromatic hydrocarbons, is by no means exclusively a selective dissolution process but also involves more or less complex chemical reactions engendered by the presence of liquid hydrogen fluoride and attended by the production of $H_2S$, $H_2$, the dehydrocondensation of certain polycyclic aromatic hydrocarbons to form more highly fused ring systems, various reactions of mercaptans and even other chemical reactions which are at this time little understood because of the constitutional complexity of high boiling, sulfur-containing hydrocarbon oils, particularly high sulfur West Texas gas oils. At any rate, the refining of hydrocarbon oils with liquid hydrogen fluoride according to the present invention comprises the operation of contacting the hydrocarbon oil and HF, and stratifying the mixture resulting from the contacting operation to produce a hydrogen fluoride-immiscible purified hydrocarbon oil and an extract layer which is a solution of water, $H_2S$ and other sulfur compounds and tarlike, highly condensed polycyclic aromatic hydrocarbons in liquid hydrogen fluoride.

High boiling hydrocarbon oils such as gas oils which contain sulfur compounds and dissolved and/or dispersed water form, following contacting with liquid hydrogen fluoride, an extract layer which is extremely corrosive because of the presence of both $H_2O$ and $H_2S$ therein. The extremely corrosive nature of said extract has posed a considerable problem and has tended to retard the practical application of HF refining to high boiling high sulfur hydrocarbon oils. Furthermore, no sufficiently satisfactory process has heretofore been available to effect the separation from said extract of an HF stream suitable for recycle to the refining process. Previous processes for the separation of the type of extract here under consideration have produced vapor streams having a high concentration of both $H_2O$ and $H_2S$, in addition to HF, and these vapor streams have proven to be extremely corrosive. No means have heretofore been suggested for coping with the corrosion problems resulting from the presence of considerable quantities of $H_2S$ in so-called "azeo" towers wherein an HF vapor stream is produced as distillate and a constant boiling mixture or azeotrope of HF and $H_2O$ is produced as the bottoms fraction.

It is an object of this invention to provide an improved method of treating hydrocarbon oils with liquid hydrogen fluoride, particularly to provide an improved method for the separation and recovery of hydrogen fluoride from the extract layer. Another object of this invention is to provide apparatus for practicing the process of this invention. A further object is to provide a practical method for removing substantial proportions of water and hydrogen sulfide from hydrogen fluoride extracts derived by the treatment of high boiling hydrocarbon oils containing dissolved water and sulfur compounds, in order to produce hydrogen fluoride streams suitable for the further treatment of said hydrocarbon oils. These and other objects will become evident from the following description of our invention.

Briefly, the initial contacting of charging stock with hydrogen fluoride and the stripping of the raffinate are effected in more or less conventional manner. The bulk of the hydrogen fluoride appears in the extract as does also the bulk of the water charged to the extraction column with the oil feed. This water must be eliminated from the process and HF, substantially anhydrous, must be recovered for recycle. To accomplish these results, the extract is passed through a first evaporator operated under conditions to remove about 35 to 40% of the HF (containing about 0.9% water) and substantially all of the free $H_2S$; this stream is sent directly to the HF accumulator for re-use. The liquid from the first evaporator is then passed through a second evaporator operated under conditions to remove about 50% of the HF originally contained in the extract, the removed vapor stream containing substantially no $H_2S$ and upwards of 1% of water. By a partial condensation of this last stream, most of its contained water can be concentrated in a relatively small amount of condensed HF so that all of the water introduced with the original charging stock can be concentrated into less than 3% of the HF originally present in the extract. This step of the process enormously simplifies elimination of water from the system since it concentrates the water in a very small fraction of the HF without the use of an exceedingly large azeotrope tower. Also the HF is not contaminated with $H_2S$ and therefore can be subjected to azeotropic distillation without serious corrosion difficulty.

The $H_2S$ is largely accumulated in the common HF accumulator from the extract and raffinate strippers and the gas stream from this accumulator (together with any gas vented from HF storage) is scrubbed with a water-HF azeotrope, the scrubbing removing hydrogen fluoride. If desired the gaseous effluent from the azeotrope scrubbing step may be given a second scrubbing wherein an aqueous alkali solution is used as the scrubbing medium as described herein below. The enriched azeotrope scrubbing liquid is combined with the partial HF condensate in which water has been concentrated and substantially anhydrous HF is removed from this mixture by distillation.

The invention will be more clearly understood from the following detailed description of the following specific example, read in conjunction with the accompanying figure which forms a part of this specification and which is a simplified flow diagram of a large commercial plant for practicing the invention.

Apparatus and a process suitable for carrying out the present invention are exemplified in the appended figure. The following example illustrates the application of the present invention in a plant for refining about 40,000 barrels per stream day of a mixture of high sulfur virgin gas oil, coke still gas oil and cracked gas oil, said mixture having a gravity of 26.1° A. P. I. and sulfur content of 1.89 weight percent, and containing water in amounts as high as about 0.1 percent by weight. The illustrative example covers the treatment of this combined charging stock with about 30 percent by volume thereof of nearly anhydrous liquid hydrogen fluoride to produce 31,643 barrels per stream day of an anhydrous raffinate having a gravity of 31° A. P. I. and a sulfur content of 0.74 weight percent and 8,088 barrels per stream day of an extract having a gravity of 6.8° A. P. I. and a sulfur content of 5.53 weight percent. Hydrogen fluoride is present in the raffinate in the amount of about 0.0010 to 0.01 weight percent and in the extract in the amount of about 0.01 to about 0.1 weight percent. The term "barrel" as used herein refers to a 42 gallon barrel, the volume being measured at 60° F. The following illustrative example concerns a plant wherein as much as 3 tons of $H_2S$ may be formed per stream day and must be segregated and subjected to disposal. The raffinate produced by the present process is a highly desirable charging stock for the preparation of distillate fuel oils, and especially for catalytic cracking to produce high octane, low sulfur gasoline.

The gas oil charging stock is passed through line 10 into a tank 11 wherein it accumulates and remains in a quiescent condition which permits the settling of dispersed or emulsified water therefrom to produce a lower layer 12 which is withdrawn from the system through valved line 13. If desired, the settling of dispersed or emulsified water from the charging stock can be facilitated by the addition of various chemical reagents which are known to function as demulsifying agents. We have observed that simple settling will remove a substantial proportion of dispersed water from gas oil charging stocks. However, if it is desired, various other means may be employed, as is well-known in the art, to remove dispersed or emulsified water from the charging stock. An upper layer of oil 14 forms in tank 11 and aliquot portions of this layer are withdrawn through valved line 15 into heat exchanger 15A, which brings it to the desired contacting temperature, thence into a contacting zone 16 for treatment with liquid hydrogen fluoride.

Contacting zone 16 is represented in the figure as a vertical tower which is suitably provided with packing material to increase the intimacy of contacting between HF and the charging stock. The packed zone is generally represented at 17. Suitable packing materials are shaped fragments of HF-resistant solids, for example carbon steel Raschig rings. However, Berl saddles or even shaped monel screen fragments or expanded lath may be employed. The contacting tower may be fabricated of carbon steel.

The gas oil charging stock is introduced into tower 16 at a point below the packed zone 17, uniformity of distribution being assured by the employment of distributing means such as spray headers. The liquid hydrogen fluoride refining agent is passed from accumulator 18 through valved line 19 into tower 16 at a point near the top thereof immediately above packed zone 17. The counterflow of gas oil and the hydrogen fluoride refining agent through packed zone 17 results in extraction and chemical reaction, finally resulting in the production of two immiscible liquid phases separated by the interface 20. It is preferred to maintain a sufficient accumulation or holdup of extract layer in tower 16 to place the interface between the extract and raffinate phases at a high point in the tower, preferably above packed zone 17. Thus, the lower, heavier liquid phase which is rich in hydrogen fluoride is continuous throughout the packed contacting section of the tower and the gas oil introduced through line 15 is discontinuous throughout the same section and disengages at interface 20 to produce the upper, lower density liquid phase which constitutes the refined gas oil. It is preferred to introduce the hydrogen fluoride treating agent at a point in the tower between the upper limit of the packed section 17 and interface 20.

For a plant of the size under consideration here, the charging rate of oil is about 523,000 pounds per hour and of water, which is present in the charging stock, about 525 pounds per hour. The total charge of hydrogen fluoride reagent stream per hour is about 174,000 pounds, of which 172,100 pounds is hydrogen fluoride, about 1300 pounds (0.75 weight percent) is water, 170 pounds is $H_2S$ and about 470 pounds is HF-soluble oil derived from previous contact of the hydrogen fluoride reagent stream with gas oil charging stock.

Contacting in tower 16 is usually effected at about 120° F., although, in general, temperatures between about 50° F. and about 150° F. may be used, preferably temperatures between about 90° F. and about 150° F. The pressure employed in tower 16 is sufficient at least to maintain the liquid phase and will ordinarily be selected in the range of about 30 to about 100 p. s. i. g. A convenient pressure to be used is 70 p. s. i. g., since this facilitates the passage of raffinate and extract layers into the downstream HF-separation equipment. The total holding or residence time of oil and HF fed to tower 16 may vary from about 5 to 50 minutes, although it is usually about 15 minutes.

Following the contacting and stratifying operations, raffinate or purified gas oil is withdrawn from the upper portion of tower 16 through conduit 21, heat exchanger 22 and conduit 23 into raffinate stripper 24. The upper part of tower 24 may be constructed of stainless steel and the lower portion of carbon steel. Raffinate is introduced into stripper 24 at the rate of about 405,000 pounds per hour, of which about 401,500 pounds per hour is purified oil and about 3,000 pounds per hour is hydrogen fluoride, together with very small proportions of $H_2O$ and $H_2S$. Stripper 24 is provided with bubble trays or equivalent gas-liquid contacting means. Heat for the stripping operation is supplied by trapping out stripper bottoms which are passed through line 26 into heat exchanger 22 to preheat the charge to tower 24, thence through line 27, reboiler 28 and line 29 into the sump of stripper 24. Stripper 24 may suitably be operated with a top temperature between about 90° and about 250° F., a bottom temperature between about 500° and about 650° F. and pressures between about 0 and about 50 p. s. i. g. Thus, satisfactory stripping may be effected in tower 24 by employing a top temperature of 215° F. and a bottom temperature of 560° F. at a top pressure of 8 p. s. i. g. and a bottom pressure of 10 p. s. i. g. The tower top pressure is set at 8 p. s. i. g. in order to be high enough to condense hydrogen fluoride, which passes overhead, by the use of cooling water at ordinarily available temperatures and yet be low enough to permit the maintenance of a minimum tower bottom temperature.

A vapor stream comprising principally hydrogen fluoride passes overhead from stripper 24 through line 30 and condenser 31 into accumulator drum 32, whence the condensate comprising principally hydrogen fluoride is withdrawn from line 33 through valved line 34 into the upper portion of stripper 24 to serve as reflux. A stream consisting essentially of liquid hydrogen fluoride containing 3 weight percent of water is introduced in the amount of about 6,800 pounds per hour into stripper 24 through line 34. The stream passing overhead from stripper 24 consists essentially of hydrogen fluoride, about 2.5 weight percent of water and about 0.3 weight percent of $H_2S$, the total being about 10,600 pounds per hour.

Stripped raffinate is discharge from tower 24 through valved line 25, whence it may be passed to a catalytic cracking unit, for example a conventional fluid catalytic cracking unit, operating at a temperature between about 800 and about 1000° F., employing a natural or synthetic solid siliceous catalyst. The raffinate stream usually produced contains only of the order of about 0.01 weight percent of HF and may, therefore, be employed as a heat exchange medium in various services in the plant prior to charging to the catalytic cracking operation.

Extract material is withdrawn from the lower end of treating tower 16 through line 35 and is passed to the first-stage evaporator 36, which is provided with heating coils 37, a weir 38, a vapor vent line 39 and liquid discharge line 40. The evaporator may suitably be fabricated of stainless steel. Extract layer is discharged from tower 16 at the rate of about 292,700 pounds per hour, of which about 169,000 pounds per hour is HF, 1,800 pounds is water, about 400 pounds is $H_2S$ (free and chemically bound) and the remainder constitutes hydrocarbon oil and gas.

The operations in the first-stage evaporator are controlled to produce a vapor stream containing substantially the entire content of free $H_2S$ which was present in the extract layer, together with a substantial proportion, usually about 25 to about 50 per cent, of the HF, together with a substantial proportion of the $H_2O$ content of the extract. Suitable operating conditions in the first-stage evaporator are temperatures between about 150° and about 250° F. and pressures between about 30 and about 65 p. s. i. g. In an exemplary operation, the temperature in the first-stage evaporator is maintained at 177° F. by controlled heat exchange with stripped raffinate from tower 24, and the pressure of 53 p. s. i. g. A suitable holding time for the liquid residue in the first-stage evaporator is about 2 minutes. Under these conditions about 37 percent of the free hydrogen fluoride content of the extract layer is vaporized, together with all the free $H_2S$ contained therein; specifically, under these conditions, hydrogen fluoride vapor is generated at the rate of about 62,600 pounds per hour, together with about 560 pounds per hour of water and about 150 pounds per hour of $H_2S$. The vapor generated in the first-stage evaporator passes overhead through line 39, condenser 41 and line 42 into manifold 33, thence to HF accumulator 18.

Accumulator 18 is provided with valved line 100 for the introduction of make-up HF and a valved vent line 101 which is normally closed but which may be employed, from time to time, to bleed a vapor stream comprising essentially HF and $H_2S$ to line 84 and finally to absorption tower 83, whose function and operation will be described hereinafter.

The liquid residue of the first-stage evaporation passes over weir 38 into a sump, whence it is discharged by line 40 into the second-stage evaporator 43, suitably made of stainless steel, provided with a heating coil 44 and weir 45. Liquid residue is produced at the rate of about 229,200 pounds per hour of which 106,500 is hydrogen fluoride, 1,240 is $H_2O$, 260 is $H_2S$ (chemically bound) and the remainder is hydrocarbon oil and gas.

The operating conditions in the second-stage evaporator are controlled to remove most of the remaining free hydrogen fluoride and water contained in the extract material derived from the first-stage evaporator. Suitable operating conditions are temperatures between about 200 and about 300° F. and pressures between about 10 and about 50 p. s. i. g. An exemplary operation can be conducted at about 240° F., 35 p. s. i. g., and a liquid holding time of about 3 minutes, resulting in the removal of 49 percent of the HF contained in the extract layer derived from tower 16. In the exemplary operation HF vapor is generated at the rate of about 82,500 pounds per hour, together with about 860 pounds per hour of water and passes overhead from evaporator 43 through line 46 into a fractional condenser 47. Coolant is supplied to fractional condenser 47 to remove heat from the vapor stream of line 46 at a rate sufficient to condense between about 10 and about 25 weight percent of the HF content of said stream, preferably at a rate sufficient to condense between about 15 and about 20 weight percent of the HF content of said stream. We have observed that the fractional or partial condensation carried out in this manner produces a condensate containing a far higher percentage of water, even as much as 10 times, as the vapor stream charged to the fractional condenser. A very important feature of our invention, therefore, is the fractional condensation of the vapor stream generated in the second-stage evaporator to produce a condensate having a high concentration of water and a secondary vapor stream having a very low concentration of water, said secondary vapor stream being suitable for complete condensation and recycle directly to the treating process or to the HF accumulation zone.

By way of example, fractional condenser 47 may be operated to condense about 6 percent of the HF and 62 percent of the water charged thereto.

A mixed gas-liquid stream is passed from condenser 47 through line 48 into a separator 49. A liquid stream of about 4,800 pounds per hour of HF and 530 pounds per hour of water is withdrawn from the lower end of separator 49 through valved line 50 and constitutes the principal charge to azeotropic distillation tower 66 for water removal from the system. Passing overhead from separator 49 is a stream consisting essentially of HF, produced in the amount of about 77,700 pounds per hour and water in the amount of about 330 pounds per hour, which stream is passed by line 51 through condenser 52, thence through line 53 into manifold 33 for recycle to HF accumulator 18.

It will be noted that by the two-stage evaporation operations described above, free $H_2S$ is segregated in that portion of the treating system which contains very little water, thus greatly reducing corrosion in the system, for the system $HF—H_2O—H_2S$ is extremely corrosive. Furthermore, the above-described manner of operating second-stage evaporator 43 and fractional condenser 47 results in the production of a liquid HF stream containing about 11 weight percent of water, based on HF, and an HF-vapor stream containing only about 0.4 weight percent of water, based on HF, the latter being highly suitable for condensation and direct recycle to the treating process.

The extract residue produced in evaporator 43 flows over wier 45 into a sump, whence it is discharged through valved line 54 into a heat exchanger 55, thence through line 56 into the upper portion of extract stripping tower 57 which is provided with bubble trays or equivalent gas-liquid contacting means 58. Under the operating conditions described above, the flow of material through line 56 will be about 120,350 pounds per hour, of which 24,000 pounds is HF, 380 pounds is water, 262 pounds is material from which $H_2S$ is formed in the extract stripper and the remainder is hydrocarbon oil and gas.

Extract stripping tower 57 may be operated at a top temperature between about 90 and about 250° F., at a pressure between about 0 and about 50 p. s. i. g. at the tower bottom and temperatures between about 575° and about 700° F. for liquid bottoms in the tower. Suitable operating conditions are a tower top temperature of 215° F. and pressure of 8 p. s. i. g., with a bottoms temperature of 640° F. and pressure of 10 p. s. i. g. This high bottoms temperature effects the thermal decomposition of at least the material containing bound sulfur (from which $H_2S$ is formed) and produces a residue of tar-like hydrocarbon material. The bottoms temperature is suitably maintained by trapping out a portion thereof and passing it through line 59 and reboiler 60, thence through line 61 back to the lower portion of tower 57.

Vapor is passed overhead from tower 57 through line 62 into manifold 30, joining the vapor stream passing overhead from raffinate stripper 24, thence through condenser 31 into accumulator 32. The vapor stream passing into condenser 31 comprises about 46,200 pounds per hour of HF, 990 pounds per hour of water and 300 pounds per hour of $H_2S$. The $H_2O$ and $H_2S$ concentrations in this stream are, accordingly, 2.1 and 0.6 weight percent, based on HF.

A condensate comprising about 33,150 pounds per hour of HF containing about 3 weight percent of water and 0.1 weight percent of $H_2S$, based on HF, is withdrawn from accumulator 32 through line 33, whence an aliquot portion comprising about 12,600 pounds per hour of HF and 380 pounds per hour of water is withdrawn through valved line 63 into the upper portion of stripper 57 to serve as reflux. Stripped extract material is withdrawn from tower 57 through valved line 64 and heat exchanger 65, whence it is discharged from the system. In the exemplary operations, extract material is produced at the rate of about 120,360 pounds per hour; the extract material has a gravity of 6.8° A. P. I., contains about 5.5 weight percent of sulfur and not more than about 0.1 weight percent of HF.

Consideration will be given at this point to the net removal of water from the system. An $HF—H_2O$ stream is passed from separator 49 through valved line 50 into the upper portion of azeotropic distillation tower 66. If desired, the stream in line 50 may be joined by condensate passing through manifold 33 and valved line 67, although normally no diversion of condensate is made through valved line 67 into line 50. Likewise, no diversion of the stream from line 50 through valved line 68 back to manifold 33 is ordinarily made, although when the occasion requires, this can be done. Tower 66 is provided with bubble cap trays or equivalent gas-liquid contacting means 69. The operations in tower 66 are so conducted as to remove a substantially anhydrous stream of HF vapor overhead and to discharge an $HF—H_2O$ azeotrope as bottoms. Suitable operating conditions comprise tower top temperatures between about 70° and about 130° F., together with pressures between about 0 and about 30 p. s. i. g. and slightly higher pressures. A suitable temperature is maintained in the tower bottoms by trapping out liquid and discharging it through line 70 into reboiler 71, thence through line 72 back into the lower portion of the tower. By way of example, tower 66 may be operated with a top temperature of 106° F. and pressure of 15 p. s. i. g. and a bottoms temperature of 270° F. and pressure of 17 p. s. i. g.

A vapor stream consisting essentially of anhydrous hydrogen fluoride passes overhead from tower 66 through line 73 and condenser 74 into accumulator from 75, from which liquid, substantially anhydrous hydrogen fluoride is discharged through line 76, whence a portion is passed through valved line 77 into the upper portion of tower 66 to serve as reflux and the remainder is passed through valved line 78 into HF accumulator 18. Drum 75 is provided with a valved vent line 79, through which there is normally no flow but which may be employed, if desired, to pass a gas stream comprising hydrogen sulfide which may accumulate in small proportions over a long period of operation, into absorption tower 83, thence through valved line 92 or if desired, to neutralizing tower 96 as described hereinbelow.

A constant boiling mixture of HF and H2O is withdrawn from the lower end of tower 66 through line 80, whence a portion thereof may be passed into valved line 81 in the amount of about 370 pounds of HF per hour and about 510 pounds of water per hour for further treatment and discharged from the system, as will be hereinafter described, to maintain the system in water balance.

Most of the constant boiling mixture of HF and water is diverted from line 80 through valved line 82 into the upper portion of HF absorption tower 83. A stream of about 12,250 pounds per hour of HF and 16,900 pounds per hour of waater may thus be charged to tower 83.

The principal, and ordinarily the sole, gas stream charged to tower 83 is derived from accumulator 32, from which it is pumped through line 84. The stream in line 84 consists of about 13,000 pounds per hour of HF, about 270 pounds per hour of H2S and about 1,1000 pounds per hour of hydrocarbon gases. This stream is passed into a knockout drum 85 at a slightly elevated temperature and about atmospheric pressure, for example 84° F. and 0 p. s. i. g. Some of the liquids which may be carried along with the gas stream are discharged from drum 85 through valved line 86. The gas stream is discharged from drum 85 through line 87 into a compressor 88 which discharges it into surge drum 89 at about 120° F. and 15 p. s. i. g. Accumulated liquids are removed from drum 89 through valved line 90 and the gas stream is thereafter passed through line 91 into the lower portion of HF absorption tower 83.

We have made the surprising discovered that hydrogen fluoride can be readily and almost quantitatively recovered from vapor streams which, in addition, contain H2S and hydrocarbon gases by selective absorption in an absorbent which is essentially a constant boiling mixture of HF and H2O, following which the HF-enriched absorption liquid can be stripped of its HF content in excess of the amount which is present in the azeotropic composition and the resulting lean absorption liquor or HF-water azeotrope can be recycled to the absorption operation. Tower 83 is provided with bubble cap trays or similar gas-liquid contacting means and one or more trap out and cooling circuits 93 to maintain suitable temperatures.

Suitable operating conditions in tower 83 are a top temperature between about 50° and about 120° F. and pressures between about 0 and 40 p. s. i. g., with a bottoms temperature between about 120° and about 280° F. and slightly higher pressures. In a suitable manner of operation, the top of tower 83 is maintained at about 92° F. and 6 p. s. i. g. and the bottoms temperature at about 200° F., the pressure of the gas stream entering the lower portion of tower 83 through line 91 being about 8 p. s. i. g. Under the conditions of operation described above, enriched absorbent will be withdrawn from the lower end of tower 83 through line 94 for recycle to azeotropic distillation tower 66 at the rate of about 25,260 pounds of HF per hour, about 16,900 per hour of water and about 10 pounds per hour of H2S.

The vapor stream passing overhead from tower 83 will, under the above-described conditions, consist of about 30 pounds of HF, 20 pounds of water, 260 pounds of H2S and 1,135 pounds of hydrocarbon gas, all per hour. This stream may be eliminated from the system through valved line 92 or if desired the vapor stream may be passed through line 95 into neutralizing tower 96, wherein all but the hydrocarbon gases are absorbed by alkali introduced into tower 96 through line 97 and discharged through valved line 98. Gases pass overhead from tower 96 through valved line 99, usually to a flare or torch, although they may be employed for the purposes to which light hydrocarbon gases are usually put.

The alkali charged through line 97 may be a 10 weight percent solution of KOH in water and the bottoms product withdrawn from tower 96 through line 98 may contain 5 weight percent of neutralized KOH and some KF. The stream passing through line 98 may be treated by conventional methods to recover entrained oil and to regenerate the alkali. Usually oil is recovered from this stream by settling and skimming. Regeneration of the alkali content can be effected by treatment with a lime slurry made up with 10 per cent KOH solution and water which forms a $CaF_2$ precipitate upon contact with the used alkali which may be filtered and the regenerated alkali can then be recycled to line 97.

Numerous pumps, valves, etc. have been omitted from the figure in the interests of simplifying it and to avoid obscuring the invention by recounting unnecessary detail.

The foregoing description has been devoted to an exemplary embodiment of our invention and it will be apparent that many specific departures may be made therefrom without departing from the spirit of the invention. Thus, more than one extraction zone may be employed and the plurality of extraction zones may be employed in series or parallel, preferably the latter. A plurality of evaporation zones, operating in parallel, can likewise be employed. Instead of employing countercurrent flow of HF and charging stock in the treating tower, concurrent flow may be employed, although this would necessitate the employment of a separate settler to provide for the disengagement of purified oil and an extract layer. Although it is preferred that the extract layer be the continuous phase in the contacting zone 16, it is apparent that the raffinate layer may constitute the continuous phase. Instead of employing a vertical tower as the treating zone, one may employ other contacting and stratification equipment such as has heretofore been proposed and employed in the treating of hydrocarbon oils with liquid treating agents, particularly acids, and in the selective solvent refining of lubricating and illuminating oils. In such prior art operations it has been common to employ a zone wherein the oil and liquid treating agent are subjected to agitation or contact and then to pass the resultant mixture into a settling zone. Thus, the feed stock and hydrogen fluoride may be mixed by pumping through a line containing venturis or knot hole mixers and the agitated mixture may then be passed into a vertical or inclined settler which may be, if desired, suitably packed to aid the coalescence and separation of raffinate and extract layers. Another suitable form of equipment is that typified by the Stratco contractor, which is an efficient mechanical stirrer employed in conjunction with a separate settling zone.

Although we have described neutralization of the net HF-H2O azeotrope production in the plant, we may treat this azeotrope for the recovery of HF therefrom. Thus, the azeotrope may be trated with KF in an extractive type distillation to produce an HF-rich fraction.

The extract hydrocarbons discharged from the system through valved line 64, may be applied for a variety of purposes, for example as plasticizers for natural or synthetic rubber or synthetic resins such as vinyl chloride-acetate copolymers (Vinylites); as a component of asphalts; for wood impregnation, alone or together with coal tar cresols to protect wood against the action of termites or marine borers; as an additive to lubricating oils or cutting oils, etc.

From the foregoing description it will be apparent that we have accomplished the objects of our invention. It will be appreciated that we have provided a system in which corrosion is minimized. It is also characteristic of our system that the diversion of the hydrogen fluoride treating agent from the oil treating system to the regeneration system is minimized and, as a result, the inventory of HF in our system is minimal. It will also be apparent that in the above described system, hydrogen sulfide is retained in the anhydrous part of the system and is not allowed to come in contact with HF-H2O azeotrope in the azeotropic distillation tower 66. A further feature of our system is that losses of HF from the system with H2S and hydrocarbon gases are minimized by the employment of a unique selective absorption operation in which HF-H2O azeotrope is employed as the absorbent medium. This invention places the preparation of raffinates for distillate fuel production and catalytic cracking from high sulfur feed stocks on a practical basis.

Having thus described our invention, what we claim is:

1. In a process for treating a hydrocarbon charging stock boiling substantially above the boiling range of gasoline, containing sulfur compounds and water, with liquid HF to produce a solution of H2O, H2S and other sulfur compounds in liquid HF and an HF-immiscible purified charging stock, respectively, the steps of subjecting said solution to evaporation to produce a first vapor stream consisting essentially of all the free H2S in said solution, HF and H2O and a first liquid residue, separately subjecting said first liquid residue to evaporation to produce a second liquid residue and a second vapor stream consisting essentially of HF and H2O containing substantially no H2S, subjecting said second vapor stream to fractional condensation to produce a relatively minor proportion of a condensate consisting essentially of HF and H2O containing HF in substantial excess of the concentration of HF in an HF-H2O azeotrope and a third vapor stream consisting essentially of substantially anhydrous HF, subjecting said condensate to fractional distillation to produce a fourth vapor stream of substantially anhydrous HF, condensing said first, third and fourth vapor streams and recycling the resultant condensates to the treating process.

2. The process of claim 1 which includes the additional steps of separately subjecting said second liquid residue to thermal decomposition to produce a residue of tarlike hydrocarbon material and a fifth vapor stream comprising essentially HF, H2O, H2S and hydrocarbon gases, fractionally condensing said fifth vapor stream to produce a condensate consisting essentially of HF and H2O containing substantially no H2S and a sixth vapor stream comprising essentially HF, H2S and hydrocarbon gases, recycling the last-named condensate to the treating process and withdrawing H2S from said sixth vapor stream and from the process.

3. The method of HF-treating a gas oil charging stock containing at least about 1 per cent by weight of sulfur and a small amount of water, which method comprises contacting said charging stock with HF containing less than 1 per cent by weight of water to form a raffinate containing a minor amount of HF and an extract containing the bulk of the HF and most of the water and sulfur compounds, evaporating the extract in a first evaporating zone under conditions to remove substantially all uncombined H2S contained therein along with HF containing less than 1 per cent water, subsequently evaporating residual liquid from the first evaporating zone in a second evaporating zone maintained at conditions for removing most of the remaining HF and water as a vapor stream substantially free from H2S, cooling said stream to effect condensation of a liquid containing approximately the amount of water introduced with the charging stock and a second vapor stream in which the water content is less than 1 per cent by weight and recovering substantially anhydrous HF from the condensed liquid.

4. The process which comprises contacting a gas oil charging stock containing dissolved water and in excess of about 1 weight percent of sulfur with between about 20 and about 50 percent by volume of liquid HF at a temperature between about 50° F. and about 150° F. under pressure sufficient to maintain the liquid phase and stratifying the mixture resulting from said contacting into a layer of purified HF-immiscible gas oil and a solution of H2O, H2S and other sulfur compounds in liquid HF, subjecting said solution to evaporation to produce a first vapor stream consisting essentially of all the free H2S in said solution, HF and H2O and a first liquid residue, separately subjecting said first liquid residue to evaporation to produce a second liquid residue and a second vapor stream consisting essentially of HF and H2O containing substantially no H2S, subjecting said second vapor stream to fractional condensation to produce a relatively minor proportion of a condensate consisting essentially of HF and H2O containing HF in substantial excess of the concentration of HF in an HF-H2O azeotrope and a third vapor stream consisting essentially of substantially anhydrous HF, subjecting said condensate to fractional distillation to produce a fourth vapor stream of substantially anhydrous HF, condensing said first, third and fourth vapor streams and recycling the resultant condensates to the treating process.

5. The process which comprises contacting a gas oil charging stock containing dissolved water and in excess of about 1 weight percent of sulfur with between about 20 and about 50 percent by volume of liquid HF at a temperature between about 50° F. and about 150° F. under pressure sufficient to maintain the liquid phase and stratifying the mixture resulting from said contacting into a layer of purified HF-immiscible gas oil and a solution of H2O, H2S and other sulfur compounds in liquid HF, subjecting said solution to evaporation to produce a first vapor stream consisting essentially of all the free H2S in said solution, HF and H2O and a first liquid residue, separately subjecting said first liquid residue to evaporation to produce a second liquid residue and a second vapor stream consisting essentially of HF and H2O containing substantially no H₂S, subjecting said second vapor stream to fractional condensation to produce a relatively minor proportion of a condensate consisting essentially of HF and H₂O containing HF in substantial excess of the concentration of HF in an HF-H₂O azeotrope and a third vapor stream consisting essentially of substantially anhydrous HF, subjecting said condensate to fractional distillation to produce a fourth vapor stream of substantially anhydrous HF, condensing said first, third and fourth vapor streams and recycling the resultant condensates to the treating process, subjecting said second liquid residue to thermal decomposition to produce a residue of tarlike hydrocarbon material and a fifth vapor stream comprising essentially HF, H₂O, H₂S and hydrocarbon gases, fractionally condensing said fifth vapor stream to produce a condensate consisting of HF and H₂O containing substantially no H₂S and a sixth vapor stream consisting essentially of HF, H₂S and hydrocarbon gases, recycling the last-named condensate to the treating process and withdrawing H₂S from said sixth vapor stream and from the process.

6. The method of HF-treating a gas oil charging stock containing at least about 1 percent by weight of sulfur and a small amount of water, which method comprises contacting said charging stock with HF containing less than 1 per cent by weight of water to form a raffinate containing a minor amount of HF and an extract containing the bulk of the HF and most of the water and sulfur compounds, separately removing HF from the raffinate and extract under conditions to give condensed HF containing less than 1 per cent water, a small HF-water condensate substantially free from H₂S, and an H₂S-containing gas stream which also contains HF, distilling substantially anhydrous HF from said condensate to obtain a residual liquid HF-water stream, scrubbing said H₂S-containing gas stream with said residual stream to recover HF therefrom, and returning said HF-water stream enriched with absorbed HF to said distillation step.

7. In a process for treating a hydrocarbon charging stock boiling substantially above the boiling range of gasoline, containing sulfur compounds and water, with liquid HF to produce a solution of H₂O, H₂S and other sulfur compounds in liquid HF and an HF-immiscible purified charging stock, respectively, the steps of subjecting said solution to evaporation to produce a first vapor stream consisting essentially of all the free H₂S in said solution, HF and H₂O and a first liquid residue, separately subjecting said first liquid residue to evaporation to produce a second liquid residue and a second vapor stream consisting essentially of HF and H₂O containing substantially no H₂S, subjecting said second vapor stream to fractional condensation to produce a relatively minor proportion of a condensate consisting essentially of HF and H₂O containing HF in substantial excess of the concentration of HF in an HF-H₂O azeotrope and a third vapor stream consisting essentially of substantially anhydrous HF, subjecting said condensate to fractional distillation to produce a fourth vapor stream of substantially anhydrous HF and an azeotropic HF-H₂O bottoms fraction, condensing said first, third and fourth vapor streams and recycling the resultant condensates to the treating process, separately subjecting said second liquid residue to thermal decomposition to produce a residue of tarlike hydrocarbon material and a fifth vapor stream comprising essentially HF, H₂O, H₂S and hydrocarbon gases, fractionally condensing said fifth vapor stream to produce a condensate consisting essentially of HF and H₂O containing substantially no H₂S and a sixth vapor stream consisting essentially of HF, H₂S and hydrocarbon gases, recycling the last-named condensate to the treating process, selectively absorbing HF from said sixth vapor stream by contacting said stream with a portion of said azeotropic HF-H₂O bottoms fraction, and recycling HF thus recovered to the treating process.

8. In a system for treating a hydrocarbon oil containing dissolved water and sulfur compounds with liquid HF, a contacting means, a conduit for admitting oil to said contacting means, a conduit for admitting HF to said contacting means, said contacting means including a stratifying section which forms a part thereof, a conduit for withdrawing purified oil from said stratifying section, a first evaporator, means for heating said first evaporator, a conduit for withdrawing a solution of H₂O, H₂S and other sulfur compounds in liquid HF from said stratifying section to said first evaporator, a first condenser, a vapor conduit between said first evaporator and said first condenser, means for introducing condensate produced in said first condenser into said contacting means, a second evaporator, a conduit for introducing liquid from said first evaporator into said second evaporator, means for heating said second evaporator, a second condenser, a vapor conduit between said second evaporator and said second condenser, an accumulator, a conduit between said second condenser and said accumulator, a third condenser, a vapor conduit between said accumulator and said third condenser, means for introducing condensate from said third condenser into said contacting means, a fractionator, a conduit for introducing liquid from said accumulator to said fractionator, a fourth condenser, a vapor conduit between said fractionator and said fourth condenser, and means for introducing condensate from said fourth condenser into said contacting means.

9. In a process for treating a hydrocarbon charging stock boiling substantially above the boiling range of gasoline, containing sulfur compounds and water, with liquid HF to produce a solution of H₂O, H₂S and other sulfur compounds in liquid HF and an HF-immiscible purified charging stock, respectively, the steps of separately removing HF from said solution and from said purified charging stock, respectively, under conditions to give condensed HF containing less than 1 per cent water, a small HF-water condensate substantially free from H₂S, and an H₂S-containing gas stream which also contains HF, distilling substantially anhydrous HF from said condensate to obtain a residual liquid HF-water stream, scrubbing said H₂S-containing gas stream with said residual stream to recover HF therefrom, and returning said HF-water stream enriched with absorbed HF to said distilling step.

JOHN J. GIACHETTO.
DONNELL H. WAGNER.
JOSEPH E. WOLF.

REFERENCES CITED

The following references are of record in the file of this patent:

UNITED STATES PATENTS

| Number | Name | Date |
|---|---|---|
| 2,450,588 | Evering et al. | Oct. 5, 1948 |
| 2,498,789 | Carnell | Feb. 28, 1950 |